United States Patent Office 2,829,178
Patented Apr. 1, 1958

2,829,178

PREPARATION OF STYRENE DICHLORIDE COMPOUNDS

Robert R. Dreisbach, John F. Mulloy, and Fred J. Lowes, Midland, Mich., assignors to The Dow Chemical Company, Midland, Mich., a corporation of Delaware No Drawing. Application September 9, 1955
Serial No. 533,497

1 Claim. (Cl. 260—651)

This invention pertains to an improved method for the preparation of styrene dichloride compounds, i. e., compounds having the general formula:

$$\text{Ar}-\underset{|}{\overset{Cl}{C}}H-\underset{|}{\overset{Cl}{C}}H_2$$

wherein the symbol Ar— represents an aromatic radical of the benzene series, and to a new compound, 1,4-dichloro-2-(1,2-dichloroethyl)benzene, obtainable by this method.

In the course of an investigation into the chlorination of 2,5-dichlorostyrene, chlorine was added to a liquid solution of 2,5-dichlorostyrene and 2,5-dichloroethylbenzene, in the absence of catalysts known to promote chlorination in the nucleus of aromatic compounds, at temperatures in the range from about −70° C. to about +70° C. Under such conditions, two new compounds were made and isolated from the reaction mixture, namely β,2,5-trichlorostyrene and 1,4-dichloro-2-(1,2-dichloroethyl)benzene. The former product, i. e., β,2,5-trichlorostyrene, is the subject of a copending application, Serial No. 533,498, filed concurrently herewith.

The direct chlorination of a body of liquid containing 2,5-dichlorostyrene with a gas stream of chlorine produced reaction products in the ratio of about two mole weights of 1,4-dichloro-2-(1,2-dichloroethyl)benzene to one mole weight of β,2,5-trichlorostyrene.

An object of this invention is to provide an improved method for the preparation of styrene dichloride compounds.

Another object is to provide such a method for the preparation of styrene dichloride compounds from styrene compounds.

A more particular object is to provide such a method for the preparation of styrene dichloride compounds without substantial formation of β-chlorostyrene compounds. A further object is to provide 1,4-dichloro-2-(1,2-dichloroethyl)benzene.

A still further object is to provide 1,4-dichloro-2-(1,2-dichloroethyl)benzene by chlorination of 2,5-dichlorostyrene with chlorine without substantial formation of β,2,5-trichlorostyrene.

Other objects and advantages of the invention will be apparent in the following description.

The objects of this invention are attained by reacting chlorine with a styrene compound, i. e. a monovinyl aromatic compound, in liquid form in the presence of an absorbent carbon.

The invention is readily practiced by establishing a porous bed of absorbent carbon such as wood charcoal in a suitable reactor, causing a styrene compound in a liquid form to flow downward over and through the porous bed in such a manner as to leave a vapor space within the bed, and supplying chlorine gas to that vapor space.

The method can be carried out with any styrene compound having the general formula:

$$\text{Ar}-CH=CH_2$$

where the symbol Ar— represents an aromatic radical of the benzene series, such as styrene, nuclear-substituted alkyl styrenes, alkoxystyrenes, halostyrenes, and the like. By the addition of chlorine to the vinyl group of the starting styrene compounds, there can be obtained the corresponding styrene dichloride compounds having the general formula:

$$\text{Ar}-\underset{|}{\overset{Cl}{C}}H-\underset{|}{\overset{Cl}{C}}H_2$$

wherein the symbol Ar— has the meaning hereinbefore given. The resulting styrene dichloride compounds are substantially free of β-chlorostyrene compounds. For example, 2,5-dichlorostyrene is chlorinated to 1,4-dichloro-2-(1,2-dichloroethyl)benzene, substantially free of β,2,5-trichlorostyrene.

Suitable absorbent carbons are already known, such as the vegetable or animal charcoals, e. g., hardwood charcoal, coconut charcoal, fruitstone charcoal, or bone char. The carbon is preferably employed in the form of pieces which can be retained in the reaction zone by suitable screens, grids, or perforated plates that are permeable to fluids.

The styrene compound starting material can be employed per se if the compound is liquid, or is liquefied at the conditions of chlorination. The starting material can be placed in liquid form by dispersing in a suitable solvent that is substantially inert to the action of chlorine under the conditions employed. For example, a suitable starting material is the liquid mixture of 2,5-dichlorostyrene and 2,5-dichloroethylbenzene that is obtained by catalytic partial dehydrogenation of 2,5-dichloroethylbenzene.

The reaction between the styrene compound and chlorine can be carried out at temperatures between about −70° C. and the temperature at which the rate and extent of polymerization of the styrene compound becomes excessive or disadvantageous. Because low temperatures are not especially advantageous, the reaction is preferably carried out at temperatures from about 0° to about 70° C., the rate of chlorination reaction increasing with an increase in reaction temperature. Temperatures appreciably above about 70° C. tend to cause polymerization of most styrene compounds in the absence of inhibitors. Temperature control in the reaction zone can readily be effected in the usual manner with jackets or coils containing heat transfer media.

The reaction is conveniently carried out at atmospheric pressure, although pressures above or below atmospheric pressure can be employed. The reaction can be carried out either in the light or in the dark, since light is neither necessary nor harmful to the course of the reaction.

Preferably an excess or chlorine is maintained in the vapor space in the reaction zone, whereby the styrene compound is substantially converted to the corresponding styrene dichloride compound. The latter can be separated from the reaction mixture by usual means such as fractional distillation. Unreacted starting materials, if any, and diluent solvents used as medium for the chlorination can be recovered for reuse.

The invention can be illustrated by the following examples, which should not be construed as limiting its scope. In the examples percentages are by weight.

*Example 1*

Into a vertical, water-jacketed glass column 1.5 inches in diameter and 36 inches long was charged 354 grams of wood charcoal in coarse, irregular pieces. Into the top of the column was charged a liquid solution of 2,5-dichlorostyrene at an average rate of 1300 grams per hour. The 2,5-dichlorostyrene solution was the flash-distilled reaction mixture obtained by catalytic partial dehydrogenation of 2,5-dichloroethylbenzene, and contained approximately 80 percent 2,5-dichloroethylbenzene and about 2 percent 2,6-dichloroethylbenzene, the remainder being principally 2,5-dichlorostyrene. At the stated rate of feed, the liquid material trickled downward over the charcoal packing without flooding the column and was withdrawn through a liquid seal at the bottom of the column. Gaseous chlorine was fed into the column, at a point near the bottom of the charcoal packing and above the liquid seal, at an average rate of 135 grams per hour. An open vent at the top of the column permitted egress of gas from the column. The average temperature in the reaction zone was about 20° C.

After six hours of operation, a sample of the chlorinated material was taken and analyzed as follows:

Specific gravity at 60°/60° F_____ 1.275.
1,4 - dichloro - 2 - (1,2-dichloroethyl)-
  benzene_____ 22 percent.
2,5-dichloroethylbenzene _____ 76 percent.
2,6-dichloroethylbenzene_____ about 2 percent.
2,5-dichlorostyrene _____ Trace.
β,2,5-trichlorostyrene _____ Nil.

The liquid chlorinated reaction mixture was washed with dilute sodium carbonate aqueous solution, dried over calcium chloride and filtered. A portion of the neutral material was fractionally distilled under reduced pressure. 1,4-dichloro-2-(1,2-dichloroethyl)benzene was collected in a fraction boiling in the temperature range from 85° to 86° C. at 0.3 mm. of mercury, absolute pressure.

*Example 2*

The apparatus described in Example 1 was modified by provision for admitting a stream of air below the liquid seal to pass upward through the column, thereby carrying the chlorine gas upward within the reactor. The column was charged with 540 grams of coconut charcoal in pieces to provide a porous bed or packing. During 176 hours of intermittent operation extending over 53 days, 700 pounds of a liquid mixture comprising 2,5-dichlorostyrene was fed to the top of the reactor column at an average rate of about 2200 cc. per hour. The 2,5-dichlorostyrene starting material was the flash-distilled reaction mixture obtained by catalytic partial dehydrogenation of 2,5-dichloroethylbenzene and was obtained in three lots, ranging from 22 to 26, and averaging 23, percent by weight 2,5-dichlorostyrene, the remainder being principally 2,5-dichloroethylbenzene. Countercurrently, there was fed chlorine in slight excess over theoretical and a small stream of air at the bottom of the column. The average temperature in the reaction zone was about 20° C. The liquid effluent material from the bottom of the reactor was washed with dilute sodium carbonate aqueous solution, dried over calcium chloride and filtered.

Analysis of many test samples of the liquid reaction mixture, taken during the operations described, showed that the 2,5-dichlorostyrene was substantially completely converted to 1,4-dichloro-2-(1,2-dichloroethyl)benzene with only traces of β,2,5-trichlorostyrene being formed. The activity of the carbon catalyst at the end of the test was as good as at its beginning.

In contrast with the results obtained in the foregoing examples, when either diatomaceous earth or silica gel was substituted for the absorbent carbon as packing material in the reactor column, the chlorinated reaction mixture contained about one part of by-product β,2,5-trichlorostyrene for each two parts by weight of the desired 1,4-dichloro-2-(1,2-dichloroethyl)benzene, the latter being obtained in proportionately reduced yield.

1,4-dichloro-2-(1,2-dichloroethyl)benzene has the following structural formula:

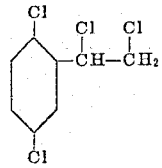

The product obtained in the examples set forth hereinbefore was a colorless, racemic mixture of enantiomorphs having these properties:

Refractive index, $n_D^{25}$_____ 1.57
Density, grams per ml. at 25° C_____ 1.45
Boiling range at 5 mm. Hg, abs. press_____° C__ 113–115

The highest melting point obtained by recrystallization was 26.8° C. The elemental analyses were as follows, the values found being average values in percent by weight, and the theoretical values being calculated for 1,4-dichloro-2-(1,2-dichloroethyl)benzene:

| | Theory, percent | Found, percent |
|---|---|---|
| Chlorine, total | 58.19 | 58.0 |
| Chlorine, side chain | 29.1 | 29.1 |

1,4-dichloro-2-(1,2-dichloroethyl)benzene has the useful property of affecting the growth of plants. It can advantageously be applied by known procedures, either as a spray or in the form of a dust, in admixture with inert liquid or solid diluents, to the foliage of growing plants to control the growth thereof, or to kill such plants. By judicious application to a mixture of plants, a selective activity can be obtained. The compound can also be admixed with agricultural soil to prevent the germination of seeds and the growth of seedlings in such soil or to do so selectively. By way of specific example, a tilled garden soil was seeded in the normal manner with millet (a grass-type plant) and with radish (a broadleaf plant), 1,4-dichloro-2-(1,2-dichloroethyl)benzene was then applied to the surface of the soil at a rate of 50 pounds per acre. The germination and growth of the millet were substantially prevented while the germination and growth of the radishes were substantially unaffected in the treated soil.

We claim:

1,4-dichloro-2-(1,2-dichloroethyl)benzene, a colorless liquid boiling at between 113° and 115° C. at 5 mm. of mercury, absolute pressure, and having the structural formula

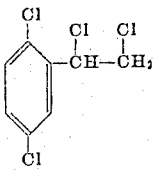

References Cited in the file of this patent

UNITED STATES PATENTS 2,576,666    Bluestone et al. _____ Nov. 27, 1951

OTHER REFERENCES

Emerson et al.: "Jour. Am. Chem. Soc," vol. 67, pages 518–520 (1945).

Huntress: "Organic Chlorine Compounds," page 894 (1948).